United States Patent
Tanaka et al.

(10) Patent No.: US 6,168,321 B1
(45) Date of Patent: Jan. 2, 2001

(54) ELECTRONIC CONTROL UNIT HAVING USER BREAKABLE FUNCTION

(75) Inventors: Ryoji Tanaka, Kariya; Hirokazu Komori, Okazaki, both of (JP)

(73) Assignee: Denso Corporation, Kariya (JP)

(*) Notice: Under 35 U.S.C. 154(b), the term of this patent shall be extended for 0 days.

(21) Appl. No.: 09/291,008

(22) Filed: Apr. 14, 1999

(30) Foreign Application Priority Data

Jun. 26, 1998 (JP) .................................................. 10-181036

(51) Int. Cl.[7] ........................................................ G06F 9/44
(52) U.S. Cl. ..................... 395/705; 365/230.03; 395/735; 395/700; 711/103
(58) Field of Search .................................... 395/705, 700, 395/735; 711/103; 365/230.01, 230.03

(56) References Cited

U.S. PATENT DOCUMENTS 5,522,076 * 5/1996 Dewa et al. ............................ 395/700
5,790,860 * 8/1998 Wetmore et al. ...................... 395/705
5,881,295 * 3/1999 Iwata ....................................... 395/735

FOREIGN PATENT DOCUMENTS 9-128229   5/1997   (JP) .

* cited by examiner

Primary Examiner—Viet Q. Nguyen
(74) Attorney, Agent, or Firm—Nixon & Vanderhye P.C.

(57) ABSTRACT

Flash ROMs store a control program for controlling an internal combustion engine and a boot program for rewriting the flash ROMs in respective storage areas. A user breakable object area is set appropriately to the flash ROMs by a user breakable function of a UBC which a microcomputer has in an ECU. Thus, even when a reading command or a writing command is issued to predetermined addresses in the user breakable object area of the flash ROMs, the processing jumps to a predetermined other address without changing the stored therein. Therefore, a request of writing to the boot program storage area of the flash ROMs, which arises from some abnormality, can be eliminated.

8 Claims, 6 Drawing Sheets

ELECTRONIC CONTROL UNIT HAVING USER BREAKABLE FUNCTION

CROSS REFERENCE TO RELATED APPLICATION

This application relates to and incorporates herein by reference Japanese Patent Application No. 10-181036 filed on Jun. 26, 1998.

BACKGROUND OF THE INVENTION

1. Field of the Invention

The present invention relates to an electronic control unit for controlling a predetermined control object, and more particularly to an electronic control unit which is capable of rewriting a control program and the like which are used for controlling a control object such as an internal combustion engine.

2. Related Art

It is known conventionally to use rewritable read only memories such as flash ROMs for electronically controlling a control object. Those flash ROMs generally have a storage area for storing a flash ROM rewriting processing program and a storage area for storing a control program for controlling the predetermined control object. As the content or data stored in the flash ROM is erased or destroyed when the data in those storage areas are rewritten erroneously, a rewriting protection guard is provided in a hardware structure as a function of the flash ROM.

The hardware guard of the flash ROM may be provided block by block. It is therefore not generally possible to guard or protect only a specified storage area in a block. As a result, even if it is tried to rewrite partly and only the stored content in the storage area storing the control program among stored contents of the flash ROM, the rewriting is disabled by the hardware guard. That is, it is necessary to remove the hardware guard even when the partial rewriting is to be executed. Thus, when the hardware guard of the flash ROM is removed to enable rewriting, the stored content will be changed or the stack used to assigns the processing order will be broken, if rewriting is executed erroneously to the storage area storing the rewriting processing program. Thus, subsequent executions of the rewriting processing to the flash ROM will not be enabled any more, if the stored content in the storage area storing the rewriting processing program of the flash ROM is rewritten.

SUMMARY OF THE INVENTION

The present invention therefore has an object to provide an electronic control unit which is capable of prohibiting erroneous processing to a predetermined storage area upon rewriting a stored content of a rewritable read only memory.

According to one aspect of the present invention, an electronic control unit for a control object has a microcomputer and a rewritable read only memory. The rewritable read only memory stores a control program for controlling the control object and a rewriting processing program in its respective storage areas. A user breakable object area is set on the rewritable read only memory by a user breakable function of the microcomputer. Thus, when a data reading command or a data writing command is issued to a predetermined address in a predetermined storage area of the rewritable read only memory, the stored content in the predetermined address is not changed. Instead, the processing jumps to a predetermined other address. Thus, execution of writing to the rewritable read only memory is avoided, even when it arises erroneously due to abnormality.

According to another aspect of the present invention, an electronic control unit for a control object has a microcomputer and a rewritable read only memory. By switching a user breakable object area of the rewritable read only memory between a rewriting processing and a normal processing, only a control program can be rewritten appropriately at the time of the memory rewriting processing. At the time of normal processing, even when the writing is requested to all the storage areas of the rewritable read only memory due to some abnormality, the control program is prevented from being broken or erased and the erroneous operation due to program aberrations is avoided.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

The present invention will be described in further detail with reference to an embodiment.

Figure 1:
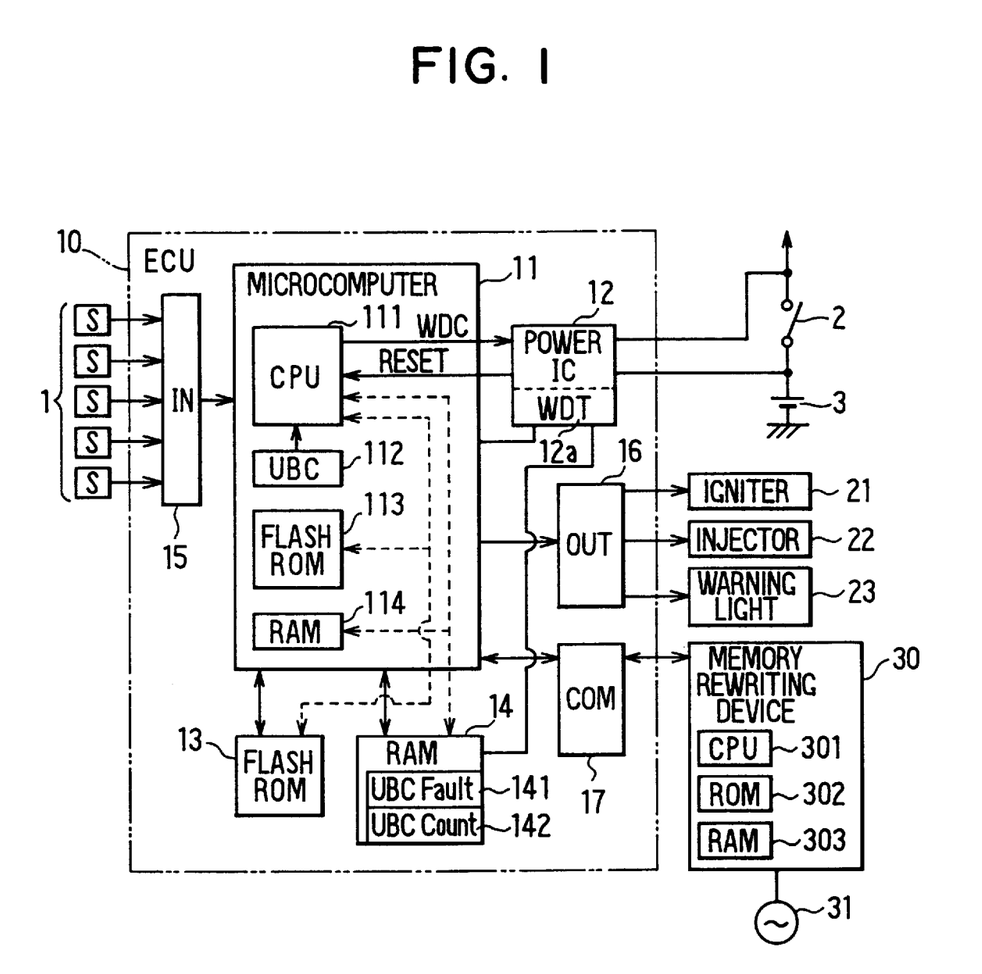
FIG. 1 is a block diagram showing an entire construction of an electronic control unit mounted on a vehicle to control an internal combustion engine according to an embodiment of the present invention.

Referring first to FIG. 1 showing an entire construction of a vehicle-mounted electronic control unit (ECU) for an internal combustion engine (not shown), the ECU is designated by numeral 10. Various sensors 1, which detect operating conditions of the internal combustion engine, are connected to the ECU 10. Sensor signals from those various sensors 1 are applied to a microcomputer 11 after being subjected to a waveform shaping processing by an input circuit (IN) 15 in the ECU 10, to an A/D conversion processing and the like. In the microcomputer 11, optimum control amounts for the internal combustion engine are calculated based on the sensor signals from the input circuit 15 and control signals resulting from the above calculations are produced to an output circuit (OUT) 16. Actuators such as an igniter 21, an injector (fuel injection valve) 22 and the like of the internal combustion engine are driven by drive signals from the output circuit 16. A warning light 23 is activated when necessary. The ECU 10 has a communication circuit (COM) 17 for executing data communications with a memory rewriting device 30, which is connected when an internal combustion engine control program and data in the microcomputer 11 are to be rewritten.

The microcomputer 11 in the ECU 10 is constructed as a logic arithmetic operation circuit, which comprises a CPU 111 as a known central processing unit, a user breakable controller (UBC) 112 for providing a user breakable function to the CPU 111, a flash ROM 113 for storing programs and data, a RAM 114 for storing various data, a bus line connecting those circuit parts, and the like. Further, a flash ROM 13 and a RAM 14 are connected externally to the microcomputer 11 of the ECU 10. The flash ROMs 13 and 113 are rewritable read only memories, which are capable of erasing and rewriting anew programs and data once written and may be EEPROMs and the like. Here, although the user breakable function is usually provided in the microcomputer 11 to enable program debugging by users, it is used as a separate function in this embodiment.

The microcomputer 11 in the ECU 10 is supplied with a main electric power through an electric power supply source IC 12 in response to an electric power supplied from a battery 3 by a turn-on of an ignition switch (IGSW) 2, and the power supply from the battery 3 is shut off by a turn-off of the IGSW 2. The power supply source IC 12 is equipped with a watch dog timer (WDT) 12a for monitoring operations of the CPU 111 of the microcomputer 11. The externally connected RAM 14 is kept supplied with a sub electric power through the power supply source IC 12 even when the IGSW 2 is turned off. Thus, in the RAM 14, a UBC fault content stored in its UBC fault storage area 141 and a UBC count number stored in its UBC count storage area are kept stored.

The memory rewriting device 30 as an externally connected device is primarily constructed by a CPU 301 for executing a serial communication with the microcomputer 11 on the side of the ECU 10, so that the programs and data stored in the flash ROMs 13 and 113 on the side of the ECU 10 are rewritten. The memory rewriting device 30 is constructed further by a ROM 302 for storing a control program, and a RAM 303 for storing various data. An electric power source circuit 31 is connected to supply a high voltage power necessary for rewriting the flash ROMs 13 and 113. That is, serial communications between the memory rewriting device 30 and the microcomputer 11 in the ECU 10 are enabled when the memory rewriting device 30 is connected to the communication circuit 17 in the ECU 10 through an electrical connector (not shown).

Figure 2:
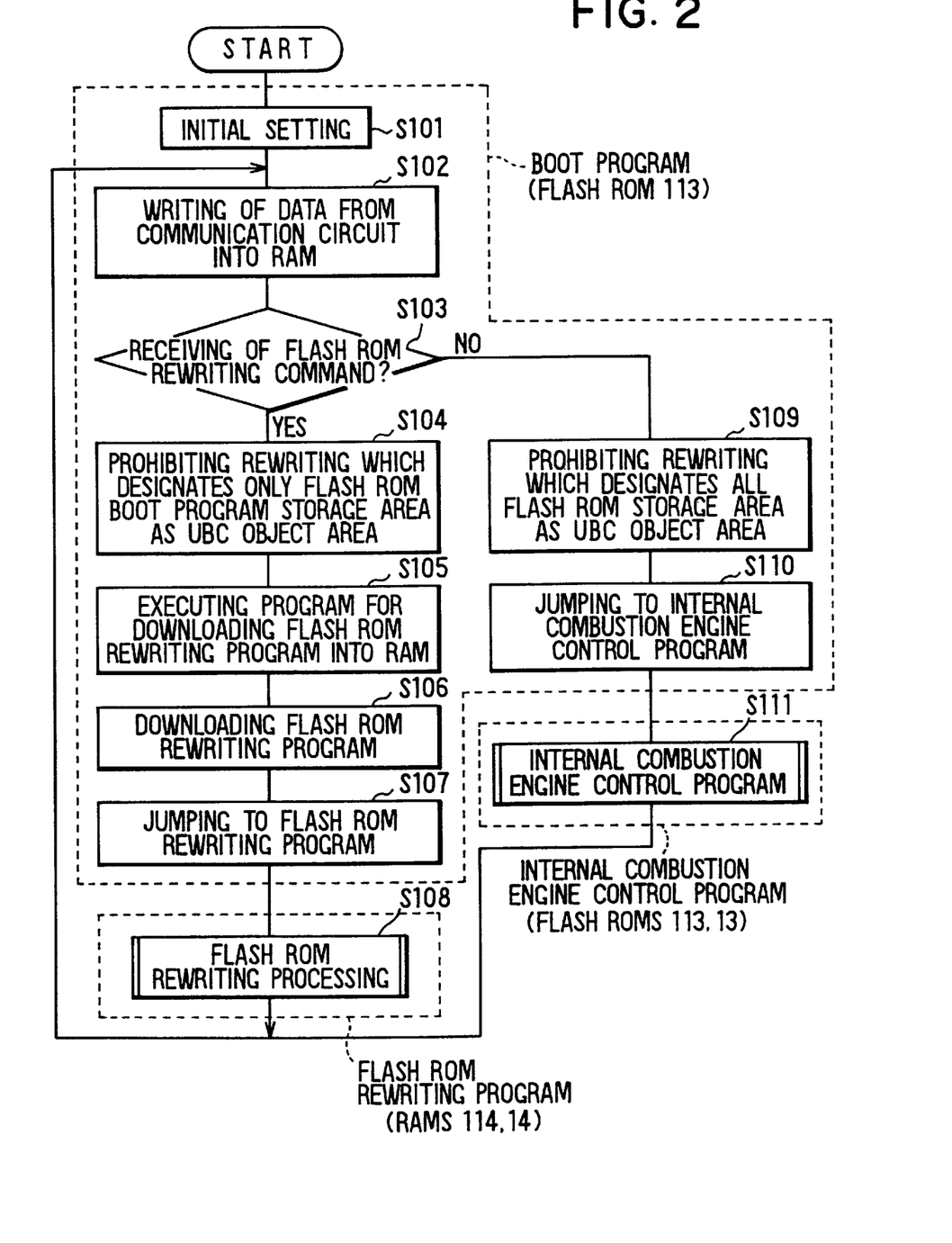
FIG. 2 is a flow diagram showing an entire processing of a central processing unit in a microcomputer used in the electronic control unit according to the embodiment.
Figure 3A:
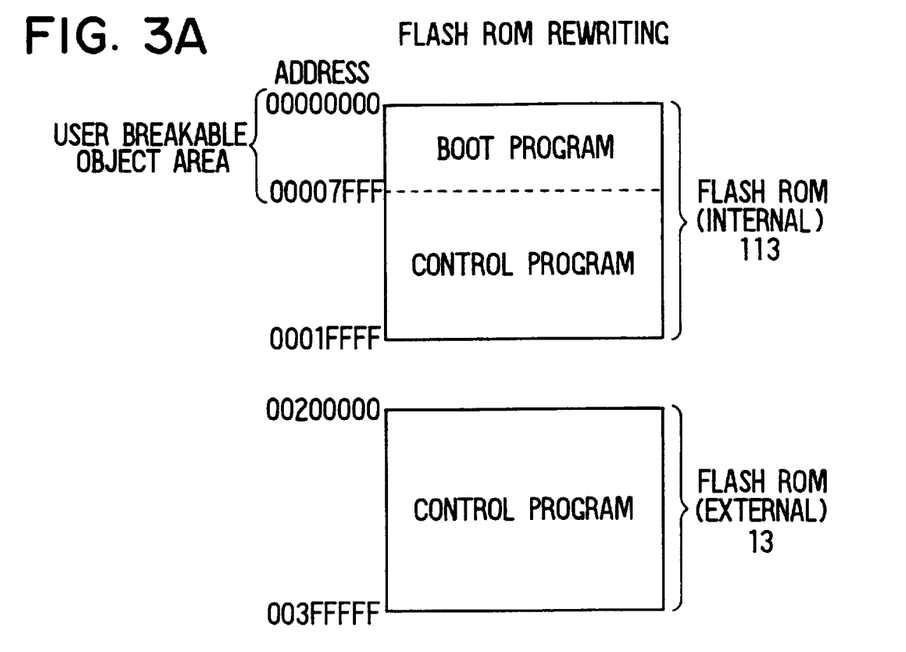
FIGS. 3A and 3B are explanatory diagrams showing relations between a boot program storage area and a user breakable object area stored in a flash ROM used in the electronic control unit according to the embodiment.
Figure 3B:
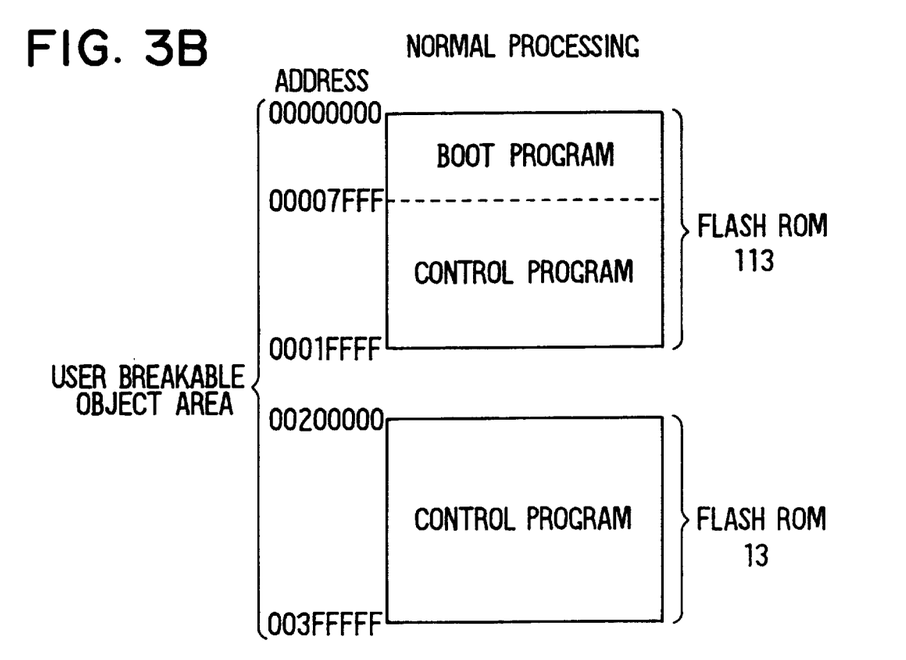

Next, the entire processing of the CPU 111 in the microcomputer 11 is described based on a flow diagram shown in FIG. 2 and with reference to FIGS. 3A and 3B. Here, as shown in FIG. 3A showing a flash ROM rewriting, only a boot program storage area storing a rewriting processing program is designated as a user breakable object area. The rewriting processing program includes a rewriting program for the flash ROM 113 among storage areas of the flash ROMs 13 and 113, or a transfer program for transferring the rewriting program to other locations. As shown in FIG. 3B showing a normal processing, all the storage areas of the flash ROMs 13 and 113 are designated as the user breakable object area.

The CPU 111 executes a routine shown in FIG. 2 repeatedly at every resetting of the CPU 111. At steps S101–S107, step S109 and step S110, the boot program stored in the boot program storage area in the flash ROM 113 of the microcomputer 11 is executed. That is, after executing an initial setting at step S101, the processing proceeds to step S102 to write data from the communication circuit 17 into the RAM 114. At next step S103, it is checked whether a flash ROM rewriting command is received. If the check condition is satisfied (YES), that is, the flash ROM rewriting command is received, the processing proceeds to step S104 to designate only the boot program storage area (addresses 00000000–00007FFF) of the flash ROM 113 as the user breakable object area by the user breakable function of the UBC 112. Thus, writing prohibition is executed not to change the contents of those addresses (FIG. 3A).

At next step S105, a program for downloading the flash ROM rewriting program into the RAMs 14 and 114 is executed. At next step S106, the flash ROM rewriting program is downloaded into the RAMs 14 and 114. At next step S107, processing jumps to the flash ROM rewriting program. After the flash ROM rewriting programs in the RAMs 14 and 114 are initiated at step S107, the processing proceeds to step S108 to execute the flash ROM rewriting processing. In this rewriting processing, a new control program and data are rewritten into the flash ROMs 13 and 113 in place of the previously stored contents.

If the check condition at step S103 is not satisfied (NO) at step S103, that is, the flash ROM rewriting command is not received in the boot program, on the other hand, the processing proceeds to step S109 to designate all the storage areas of the flash ROMs 13 and 113 as the user breakable object by the user breakable function by the UBC 112. The user breakable object area thus comprises the storage areas (addresses 00000000–0001FFFF) of the internal flash ROM 113 and the storage areas (addresses 00200000–003FFFFF) of the external flash ROM 13. The rewriting prohibition is executed not to change the stored contents in those addresses (FIG. 3B). At next step S110, the processing jumps to the internal combustion engine control program to initiate the internal combustion engine control programs in the flash ROMs 13 and 113. The internal combustion engine control program processing is executed at step S111. In this internal combustion engine control program processing at step S111, the optimum ignition timing, fuel injection amount and the like are calculated based on the various sensor signals from the input circuit 15 and the internal combustion engine control program and data in the flash ROMs 13 and 113. The control signals are produced based on the calculation result to drive the actuators such as the igniter 21, the injector 22 and the like. Thus, the internal combustion engine is controlled to the optimum operating condition by the execution of the internal combustion engine control processing.

Figure 4:
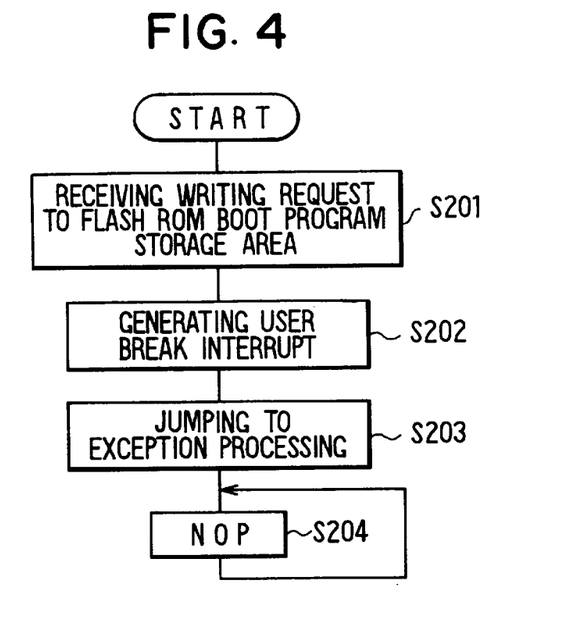
FIG. 4 is a flow diagram showing a processing to be executed, by the CPU in the microcomputer used in the electronic control unit according to the embodiment, at the time of a request of writing to the boot program storage area of the flash ROM in the course of flash ROM rewriting operation.

When a writing into the boot program storage area of the flash ROMs 13 and 113 in the microcomputer 11 of the ECU 10 is requested due to some abnormal operations in the course of flash ROM rewriting operation at step S108 in FIG. 2, the processing shown in FIG. 4 is executed.

Figure 5:
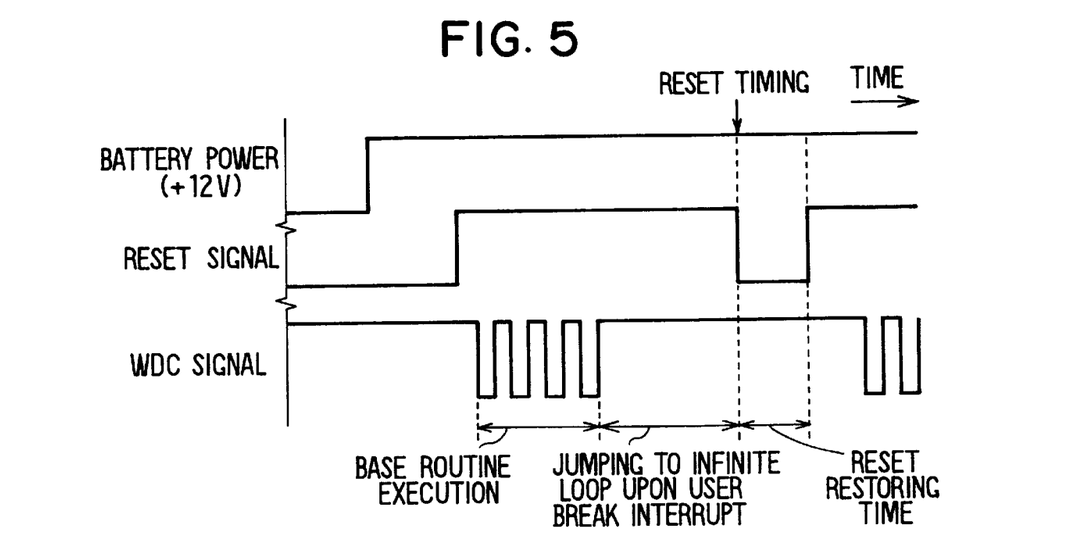
FIG. 5 is a timing diagram showing changes of a reset signal, WDC signal and the like in the electronic control unit according to the embodiment.

In this processing, when the request of writing into the boot program storage area of the flash ROM 113 is received, the processing proceeds to step S202 to generate a user breakable interrupt. Then, the processing proceeds to step S203 without rewriting the content of the boot program storage area, and jumps to step S204 to execute an exception processing. At step S204, an NOP (no operation instruction) initiates an infinite loop processing. As shown in FIG. 5, although a WDC pulse produced from the CPU 111 to the power supply source IC 12 is reversed periodically in the base routine in the course of normal processing, it can not be reversed when the infinite loop is executed in response to the user breakable interrupt processing. Thus, a reset signal is produced from the side of the power supply source IC 12 after a predetermined time interval. This reset signal changes the reset terminal of the CPU 111 from high to low level, thus resetting the CPU 111.

Figure 6:
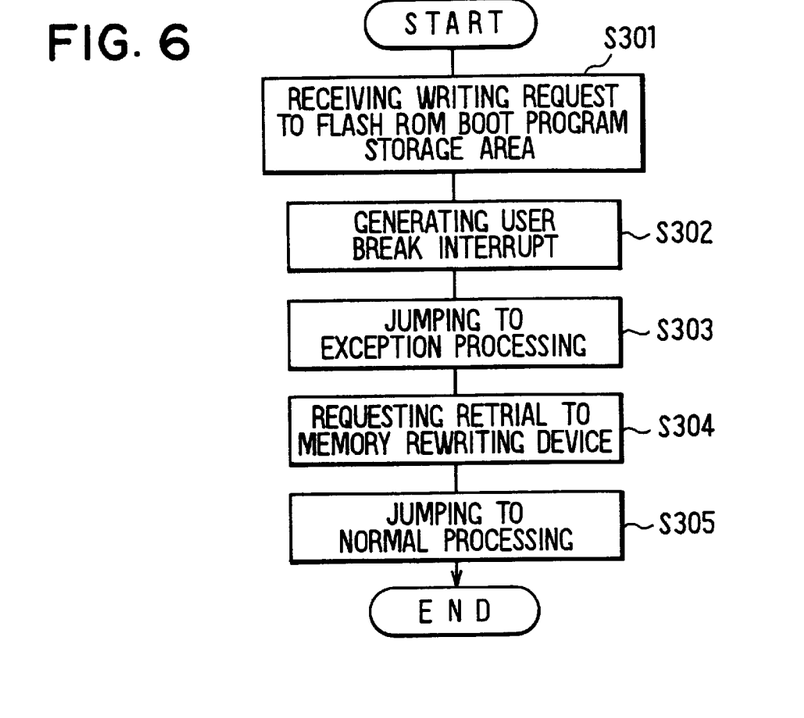
FIG. 6 is a flow diagram showing a modification of the processing shown in FIG. 4.

The above processing shown in FIG. 4 may be modified as shown in FIG. 6. That is, when a request for rewriting into the boot program storage area of the flash ROM 113 is received at step S301, the processing proceeds to step S302 to generate a user breakable interrupt. Then, the processing proceeds to step S303 without rewriting the content in the boot program storage area and jumps to step S304 to execute an exception processing. At step S304, a retrial request to the memory rewriting device 30 is executed, then proceeding to step S305. In step S305, the processing jumps to step S101 in FIG. 2 to return from the exception processing to the normal processing. Thus, the condition is set to a wait for another flash ROM rewriting request from the memory rewriting device 30. When the flash ROM rewriting request is issued again form the memory rewriting device 30, the same processing is executed.

Figure 7:
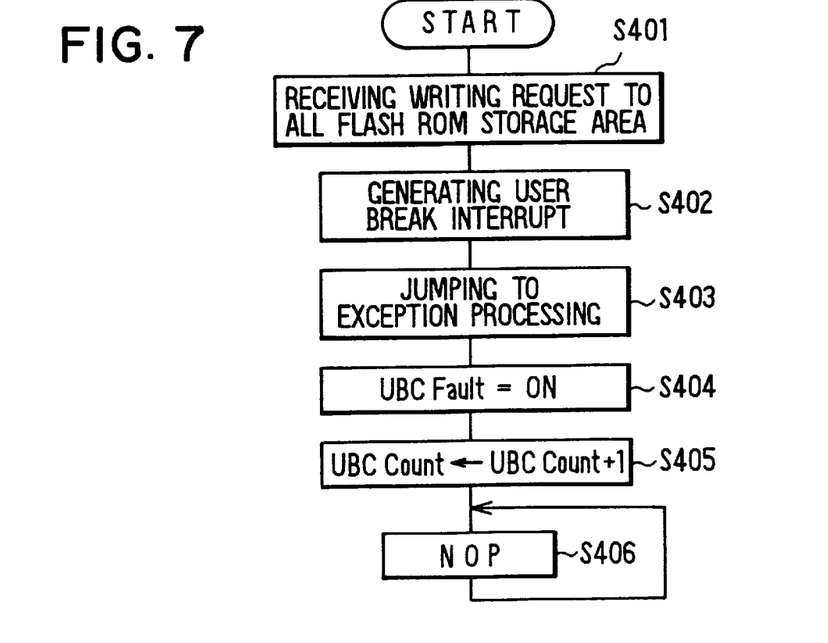
FIG. 7 is a flow diagram showing a processing to be executed, by the CPU in the microcomputer used in the electronic control unit according to the embodiment, at the time of a request of writing to all the storage areas of the flash ROM in the course of executing an internal combustion engine control program.

On the other hand, when a writing into all the storage areas of the flash ROMs 13 and 113 in the microcomputer 11 of the ECU 10 is requested due to some abnormal operations in the course of the normal processing, that is, in the course of the internal combustion engine control processing at step S111 in FIG. 2, the processing is executed as shown in FIG. 7.

That is, when a request for writing into all the storage areas of the flash ROMs 13 and 113 is received at step S401, the processing proceeds to step S402 to generate the user breakable interrupt. Then the processing proceeds to step S403 without rewriting the stored contents in all the storage areas of the flash ROMs 13 and 113, and jumps to step S404 to execute an exception processing. At step S404, the UBC fault is turned on and stored in the UBC fault storage area 141 thereby to identify the content of abnormality. At next step S405, the UBC count stored in a UBC count storage area 142 in the RAM 14 is incremented by one (+1) to count up the number of UBC fault which occurred during the turn-on period of the IGSW 2. Then, at step S406, an infinite loop is executed by NOP. At this time, as shown in FIG. 5, although the WDC pulse produced from the CPU 111 to the power supply source IC 12 is reversed periodically in the base routine in the course of normal processing, it can not be reversed when the infinite loop is executed in response to the user breakable interrupt processing. Thus, the reset signal is produced from the side of the power supply source IC 12 after the predetermined time interval. This reset signal changes the reset terminal of the CPU 111 from high to low level, thus resetting the CPU 111.

Figure 8:
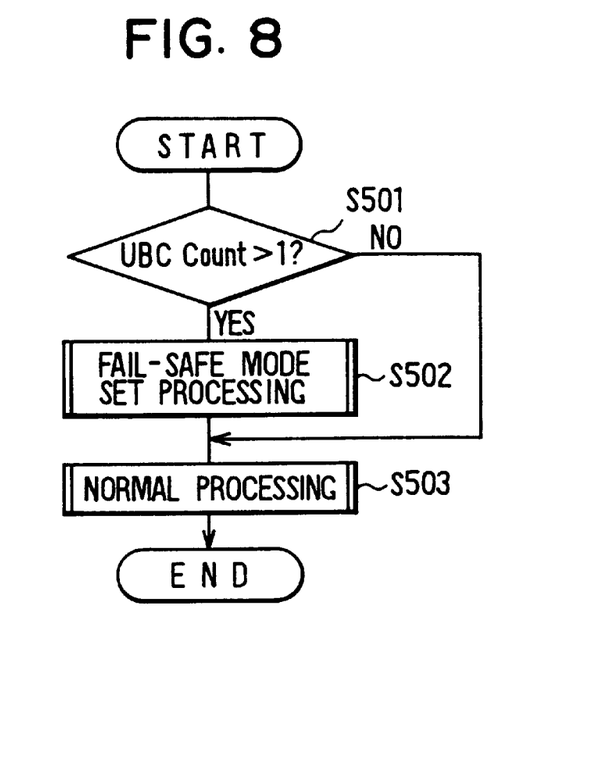
FIG. 8 is a flow diagram showing a set processing of a fail-safe mode after a reset by the CPU of the microcomputer used in the electronic control unit according to the embodiment.
Figure 9:
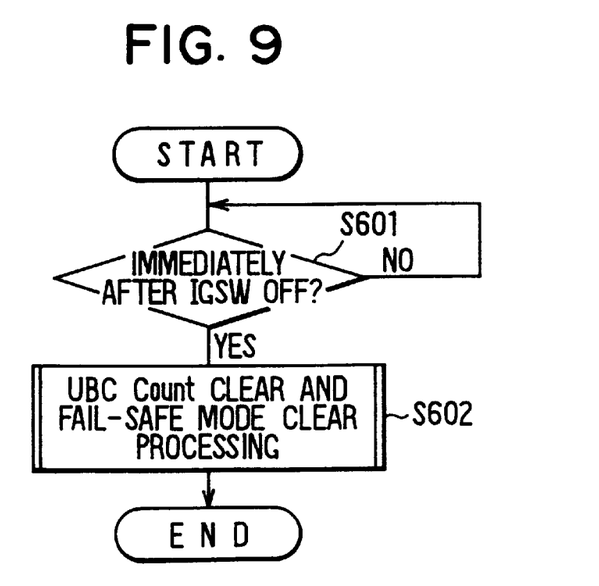
FIG. 9 is a flow diagram showing a clear processing of the fail-safe mode by the CPU of the microcomputer used in the electronic control unit according to the embodiment.

Next, a fail-safe mode set processing is executed as shown in FIG. 8 after resetting the CPU 111 in the microcomputer 11. Specifically, it is checked at step S501 whether the UBC count is equal to or more than 1. This enhances the abnormality detection accuracy, because the detection of abnormality only once is likely to result in an erroneous detection due to noise and the like. If the check condition at step S501 is satisfied (YES), that is, the UBC count stored in the UBC count storage area 142 in the RAM 14 is equal to or more than 2 and the number of UBC fault is equal to or more than 2 during turn-on of the IGSW 2, the processing proceeds to step S502. At this step, fuel cut-off, a warning light activation and the like are executed as a fail-safe mode set processing. The occurrence of abnormality in the user breakable interrupt by the UBC 112 is stored in the flash ROMs 13 and 113. On the other hand, if the check condition at step S501 is not satisfied (NO), that is, the UBC count stored in the UBC count storage area 142 in the RAM 14 is less than 1, step S502 is not executed. Normal processing is executed at next step S503, and ends this routine.

A clearing processing for the fail-safe mode of the CPU 111 in the microcomputer 11 is executed as shown in FIG. 8. Specifically, it is checked at step S601 whether it is immediately after the turn-off of the IGSW 2, because one trip is considered to start from the turn-on of the IGSW 2 and end at the turn-off of the same. If the check condition at step S601 is not satisfied, that is, the IGSW 2 is held turned on, the processing holds until the IGSW 2 is turned off. If the check condition at step S601 is satisfied, that is, the IGSW 2 is turned off from the previous turn-on, it is considered to be immediately after the turn-off of the IGSW 2. The processing then proceeds to step S602 to clear the UBC count and to release the fuel cut-off, deactivate the warning light as the clearing processing of the fail-safe mode, thus ending this routine.

As described above, according to the present embodiment, the user breakable object area is set appropriately on the flash ROMs 13 and 113 which store the control program for controlling the internal combustion engine and the boot program in respective storage areas, by the user breakable function of the UBC 112. Thus, when the reading command or the writing command is issued to the predetermined addresses in the designated storage areas of the flash ROMs 13 and 113, the processing is enabled to jump to another predetermined address without changing the content stored in the predetermined addresses. Further, the request for writing into the boot program storage areas of the flash ROMs 13 and 113, which may be caused due to some abnormality, can be eliminated.

The microcomputer 11 of the ECU 10 resets its processing when the user breakable function is effected. Thus, the user breakable function is executed with the highest priority, so that the desired processing to the user breakable object area may be initiated immediately. The microcomputer 11 of the ECU 10 stops an output to the WDT 12a, which monitors normal operation of the microcomputer 11, so that its processing at that time is reset by the WDT 12a of the power supply source IC 12, when the user breakable function is effected to initiate the interrupt. That is, the operation of the microcomputer 11 is monitored by the WDT 12a, and is reset by stopping the output to the WDT 12a when the user breakable interrupt is initiated. Therefore, even when some abnormality occurs, the microcomputer 11 is protected from breaking or losing its programs and erroneous operation of the ECU 10 caused by program aberrations is avoided.

Further, the microcomputer 11 has the UBC 112 with the user breakable function which causes, when the reading command or the writing command is issued to the predetermined address in the designated storage area of the flash ROMs 13 and 113, the jumping to another predetermined address without changing the content stored in the predetermined address. The storage area storing the rewriting processing program is set within the user breakable object area on which the user breakable function of the microcomputer 11 is effected and the storage area storing the control program is set outside of the user breakable object area on which the user breakable function of the microcomputer 11 is effected, when the rewriting is executed to the boot program storage area of the flash ROMs 13 and 113 storing the boot program. Further, both of the boot program storage area storing the boot program and the storage area storing the control program are set within the object area on which the user breakable function of the microcomputer 11 is effected, when the control is executed based on the control program.

Therefore, by the user breakable function of the UBC 112, the user breakable object area is set appropriately on the flash ROMs 13 and 113 which store the control program for controlling the internal combustion engine and the boot program in respective storage areas. Thus, by switching the user breakable object area between the rewriting of the flash ROMs 13 and 113 and the normal to processing, only the control program can be rewritten appropriately at the time of the flash ROM rewriting. At the time of normal processing, even when the writing is requested to all the storage areas of the flash ROMs 13 and 113 due to some abnormality, the control program is prevented from being broken and the erroneous operation of the ECU 10 due to the program aberration is avoided.

The microcomputer 11 counts the number of generations of the user breakable function in executing the control based on the control program, and sets the control on the internal combustion engine as the predetermined control object to the fail-safe mode when the counted number of generations exceeds the predetermined number at the time of its operation start. As a result, the microcomputer determines that some abnormality is occurring actually in the internal combustion engine and sets the fail-safe mode, when the number of generation of the user breakable function counted in controlling the internal combustion engine based on the control program. At this time, the set processing for the fail-safe mode (fuel cut-off, warning light activation, etc.) is executed. Thus, at the time of abnormality detection, erroneous detection due to noise and the like is eliminated and it can be detected accurately.

The microcomputer 11 clears the counted number of generations of the user breakable function and the fail-safe mode when the power supply is turned off. That is, the microcomputer 11 clears the number of user breakable function counted during one trip interval from the turn-on to the turn-off of the IGSW 2 and the set fail-safe mode (fuel cut-off, warning light activation and the like), immediately after the IGSW 2 is turned off. Here, the number of generation of the user breakable function during one trip interval and the fail-safe mode are stored each time in the RAM 14 which is backed up by the power supply. Thus, the number of generations of the user breakable function and the fail-safe mode can be detected anew at every trip.

In the above embodiment, the flash ROM 113 and the RAM 114 are provided inside the microcomputer 11, and the flash ROM 13 and the RAM 14 are provided outside the microcomputer 11. The present invention should not be limited such a construction, but may be implemented such that the flash ROMs and the RAMs may all be provided inside the microcomputer. Further modification and alterations are also possible without departing from the scope and spirit of the present invention.

What is claimed is:

1. An electronic control unit comprising:
   rewritable read memory means storing in respective storage areas a control program for controlling a predetermined control object and a rewriting processing program including at least one of a rewriting program and a transfer program for transferring the rewriting program; and
   a microcomputer having a user breakable function which causes, when a reading command or a writing command is issued to a predetermined address in a designated storage area of the memory means, a jumping to another predetermined address without changing a content stored in the predetermined address,
   wherein the storage area of the memory means storing the rewriting processing program is set within an object area on which the user breakable function of the microcomputer is effected.

2. An electronic control unit according to claim 1, wherein the microcomputer resets its processing when the user breakable function is effected.

3. An electronic control unit according to claim 2, wherein the microcomputer stops an output to monitor means which monitors normal operation of the microcomputer so that its processing at that time is reset by the monitor means, when the user breakable function is effected to initiate an interrupt.

4. An electronic control unit comprising:
   rewritable read only memory means storing in respective storage areas a control program for controlling a predetermined control object and a rewriting processing program including at least one of a rewriting program and a transfer program for transferring the rewriting program; and
   a microcomputer having a user breakable function which causes, when a reading command or a writing command is issued to a predetermined address in a designated storage area of the memory means, a jumping to another predetermined address without changing a content stored in the predetermined address,
   wherein the storage area storing the rewriting processing program is set within an object area on which the user breakable function of the microcomputer is effected and the storage area storing the control program is set outside of the object area on which the user breakable function of the microcomputer is effected, when a rewriting is executed to the storage area of the memory means storing the control program, and
   both of the storage area storing the rewriting processing program and the storage area storing the control program are set within the object area on which the user breakable function of the microcomputer is effected, when a control is executed based on the control program.

5. An electronic control unit according to claim 4, wherein the microcomputer resets its processing when the user breakable function is effected.

6. An electronic control unit according to claim 5, wherein the microcomputer stops an output to monitor means which monitors normal operation of the microcomputer so that its processing at that time is reset by the monitor means, when the user breakable function is effected to initiate an interrupt.

7. An electronic control unit according to claim 4, wherein the microcomputer counts the number of generations of the user breakable function in executing the control based on the control program, and sets the control on the predetermined control object to a fail-safe mode when the counted number of generations exceeds a predetermined number at the time of its operation start.

8. An electronic control unit according to claim 7, wherein the microcomputer clears the counted number of generations of the user breakable function and the fail-safe mode when a power supply is turned off.

* * * * *